Aug. 30, 1938.    A. R. BOAZ    2,128,396
APPARATUS FOR OBSERVING RECIPROCATING OBJECTS
Filed Aug. 30, 1935
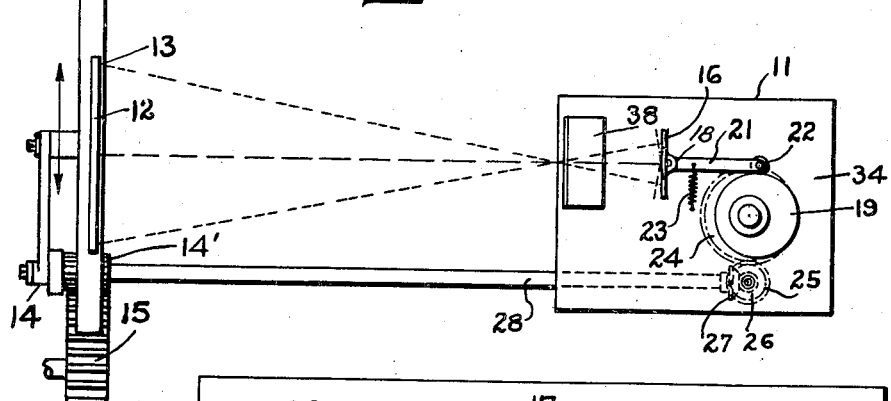
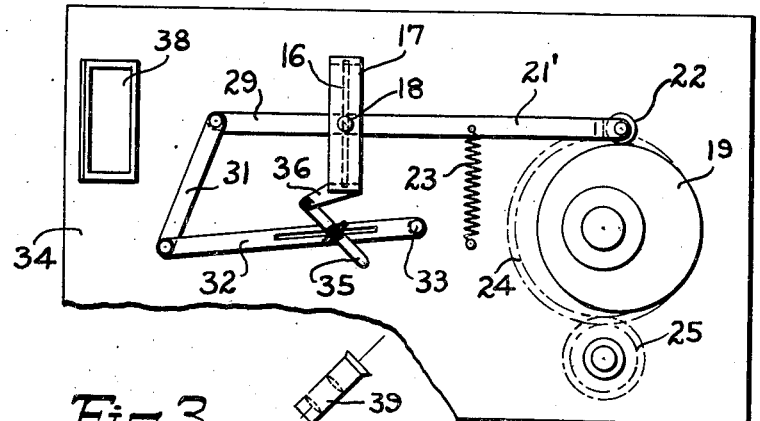
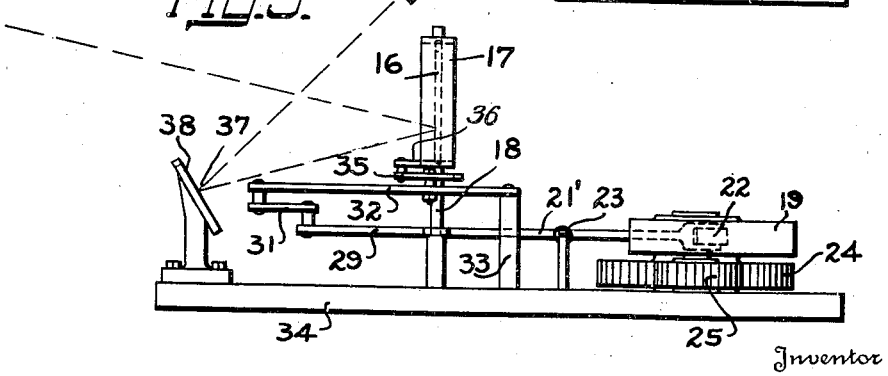
Inventor
Arthur R. Boaz
By Albert J. Horton
Attorney Patented Aug. 30, 1938

2,128,396

UNITED STATES PATENT OFFICE 2,128,396

APPARATUS FOR OBSERVING RECIPROCATING OBJECTS

Arthur Robert Boaz, Acton, London, England, assignor to R. Hoe & Co., Inc., New York, N. Y., a corporation of New York Application August 30, 1935, Serial No. 38,510

7 Claims. (Cl. 88—14)

This invention relates to improvements in apparatus for observing moving objects and more particularly to such apparatus for use in observing reciprocating objects, wherein provision is made to cause the object viewed to appear stationary.

The invention is particularly useful in observing an object or spot on the surface of a reciprocating member, to inspect or check its relative position or its condition and the accuracy of its disposition. It may be used to advantage in association with machines wherein the work operated upon reciprocates at a relatively high speed.

This invention broadly contemplates the provision of means, including an optical system arranged to reflect an image of a chosen spot or area on a reciprocating object to the viewpoint of an observer, and wherein means to compensate for the movement of the object is included, to cause the image to appear substantially stationary.

The invention has for one of its principal objects, the provision of apparatus for observing a chosen area on a reciprocating object, and which includes means to cause the area to appear stationary, and wherein this means is moved or rocked in synchronism with the reciprocation of the object, to eliminate such movement from the image thereof, to be viewed.

Another object of this invention is to provide in an apparatus for eliminating the movement in the image of a reciprocating object to be viewed, means to direct the reflection of the image to a position convenient to the vision of an observer.

A further object of this invention is to provide in apparatus of this nature, mechanism to move or oscillate a light reflecting member, disposed to receive light rays from a reciprocating object, in such a manner as to substantially eliminate movement of the image of the object as viewed and cause it to appear stationary.

It is also an object of the invention to provide an apparatus for observing reciprocating objects, of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed.

The preferred embodiment of the invention is illustrated in the accompanying drawing, wherein:

Figure 1 is a diagrammatic plan view showing the association of an apparatus embodying the features of this invention, with a reciprocating member upon which is an area or object to be viewed;

Figure 2 is a plan view of part of the apparatus shown in Figure 1, including a slightly modified arrangement for actuating the movable reflecting member; and Figure 3 is a side view of the same.

As diagrammatically illustrated in Figure 1, the apparatus of this invention may have an enclosure 11, which is disposed in relation to a reciprocating part or plate 12, whereby the said apparatus is in proper position to operate efficiently to accomplish the results desired. An area or object requiring periodic inspection or observation, it will be assumed, is disposed on the face of the plate 12, at 13. The plate or carrier 12 may be reciprocated by any desirable means as by a crank mechanism 14, the crank being secured to a pinion 14' driven by a driving gear 15.

A light reflecting member, such as a mirror 16, is mounted, as shown in Figures 2 and 3, in a frame 17, which in turn is mounted for swinging movement in a vertical plane on a supporting post or stationary shaft 18, whereby the mirror 16 may oscillate to follow the object 13, on the plate 12, as it reciprocates, and to continuously receive and reflect an image thereof. The member 16 may be given the desired swinging movement by the herein shown cam and lever combination, comprising a rotatable cam 19 and lever 21. The lever 21 is pivoted to the post 18, and in Figure 1 is shown with one end secured directly to mirror 16 and at the other end having a roller 22 in operative engagement with the cam surface of cam 19. A spring 23 maintains the roller constantly in engagement with the cam 19. As it is required that the mirror 16 swing in synchronism with the reciprocating movement of the object 13, the cam 19 is driven by a gear 24, which is in mesh with a pinion 25. The pinion 25, as shown, is rotated, through bevel gears 26 and 27, by shaft 28, to which the pinion 14' is secured.

The apparatus shown in Figures 2 and 3, includes an arrangement of levers, whereby an adjustment may be made to vary the movement of the mirror 16 to adapt the device for use where the distance through which the observed object reciprocates is variable. The arrangement provides an extension 29 to a lever 21', which, through a link 31, is connected to the end of another lever 32. The lever 32 is pivoted to a post 33, secured to a base 34, upon which all of the above parts may be mounted, and which may form one side of the enclosure 11. In this instance, the lever 21' is not secured to the mirror 16, but is freely pivoted to the post 18, and through the link 31, rocks the lever 32 in timed relation with the rotation of the cam 19.

A link 35, connects the lever 32 which is slotted, to the frame 17, which supports the mirror 16, the link 35 being pivotally secured at one end to an arm 36 extending from the said frame. By adjusting the lever 35 relatively to the lever 32, the amount of swinging movement imposed on the mirror 16, by the cam 19, may be varied.

The above described mechanism operates to cause the mirror 16 to receive and reflect an image, of the object or area 13, continuously to a common point 37, during the reciprocating of the carrier 12, and thus causes it to appear stationary at this point. Another light reflecting member 38, disposed to receive the stationary reflected image at point 37, reflects the same toward and into an image magnifying lens 39 and thence to the view of an observer.

It will be understood that the invention may be embodied in other specific forms without departing from the spirit or essential attributes thereof, and it is therefore desired that the present embodiment be considered in all respects as illustrative and not restrictive, reference being had to the claims rather than to the foregoing description to indicate the scope of the invention.

What I claim is:

1. In an apparatus for observing an object on a body mounted and actuated for reciprocating movement, an enclosure, a light reflecting member mounted for rocking movement in the enclosure, a fixed light reflecting member supported in the enclosure, and means having a component extending from the enclosure to said reciprocating body actuating means for operably connecting the said rockable light reflecting member with the reciprocating body actuating means to move the rockable light reflecting member in synchronism with the reciprocating object and in constant reflecting relation to the fixed light reflecting member to cause a reflected image of the reciprocating object to appear stationary at a fixed point of observation during the reciprocation of the object.

2. In an apparatus for observing an object on a body mounted and actuated for reciprocating movement, an independent support, a light reflecting member mounted for rocking movement on the independent support, a fixed light reflecting member supported on the independent support, means operably supported by the independent support and having a component extending from the independent support to the said reciprocating body actuating means for operably connecting the said rockable light reflecting member with the reciprocating body actuating means to move the rockable light reflecting member in predetermined relation to the fixed light reflecting member and in synchronism with the movement of the reciprocating object, the fixed light reflecting member being located to continuously receive the reflected image of the reciprocated object from the rockable light reflecting member and continuously reflect it to a fixed viewpoint.

3. In an apparatus for observing an object on a body mounted and actuated for reciprocating movement, an enclosure, a light reflecting member mounted for rocking movement in the enclosure, a fixed light reflecting member supported in the enclosure, a fixed magnifying lens observable exteriorly of the enclosure, means extending from the enclosure to said reciprocating body actuating means for operably connecting the said rockable light reflecting member with the reciprocating body actuating means to move the rockable light reflecting member in synchronism with the reciprocating movement of the object and in predetermined relation to the fixed light reflecting member to cause the rockable light reflecting member to follow the object as it reciprocates, the fixed light reflecting member being located to continuously receive the image upon its reflecting surface and continuously reflect the image to the said magnifying lens for observation from a point exteriorly of the enclosure.

4. In an apparatus for observing an object on a body mounted and actuated for reciprocating movement, an enclosure, a light reflecting member mounted for swinging movement in the enclosure, a fixed light reflecting member supported in the enclosure, and means having a component extending from the enclosure to the said reciprocating body actuating means for operably connecting the said swingable light reflecting member with the reciprocating body actuating means to impart swinging movement to the swingable light reflecting member about an axis perpendicular to the path of travel of the reciprocating body and in predetermined relation to the fixed light reflecting member to cause the swingable light reflecting member to continuously follow the object and continuously reflect its image to the fixed reflecting member, the fixed reflecting member being observable from a point exteriorly of the enclosure.

5. In an apparatus for observing an object on a body mounted and actuated for reciprocating movement, a light reflecting member mounted for swinging movement, a fixed light reflecting member, and means for operably connecting the said swingable light reflecting member with the reciprocating body actuating means to impart swinging movement to the swingable light reflecting member about an axis perpendicular to the path of travel of the reciprocating body and in predetermined relation to the fixed light reflecting member to cause the swingable light reflecting member to follow the object and continuously reflect its image to the fixed light reflecting member, said means including a cam rotating in synchronism with the reciprocating movement of the object, gears operably connected with the cam, a shaft operably connected with the gears and the reciprocating body actuating means to rotate the cam, and a lever operably connected to the swingable light reflecting member and actuated by said cam.

6. In apparatus for observing an object on a body mounted and actuated for reciprocating movement, a light reflecting member mounted for movement about a fulcrum, a fixed light reflecting member, and means for operably connecting the said movable light reflecting member with the reciprocating body actuating means to impart a swinging movement to said movable member in predetermined relation to the fixed light reflecting member to cause the movable light reflecting member to follow the object and continuously reflect its image, said means including a cam rotating in synchronism with the reciprocating movement of the object and a plurality of levers operably connected together and actuated by said cam, and means constituting the connection between two of said levers for adjusting one relative to the other to vary the amplitude of movement of said movable light reflecting member commensurate with the amplitude of the reciprocating movement of the object.

7. An apparatus for observing an object on a body mounted and actuated for reciprocating movement, comprising an enclosure, a light reflecting member mounted for rocking movement in the enclosure, a fixed light reflecting member supported in the enclosure, components operably supported in the enclosure and operable to impart rocking movement to the said rockable light reflecting member, a shaft extending from the components to the reciprocating body actuating means to impart movement from the reciprocating body actuating means to the said components thereby rocking the rockable light reflecting member in synchronism with the movement of the object on the reciprocating body, the fixed light reflecting member being located within the enclosure to continuously receive the reflected image of the reciprocated object from the rockable light reflecting member and continuously reflect it to a fixed point observable exteriorly of the enclosure.

ARTHUR ROBERT BOAZ.